(12) United States Patent
Boncodin

(10) Patent No.: US 7,065,962 B2
(45) Date of Patent: Jun. 27, 2006

(54) EXHAUST GAS PURIFYING SYSTEM

(76) Inventor: Franz B. Boncodin, P.O. Box 8157, Long Beach, CA (US) 90808

( * ) Notice: Subject to any disclaimer, the term of this patent is extended or adjusted under 35 U.S.C. 154(b) by 201 days.

(21) Appl. No.: 10/747,104

(22) Filed: Dec. 30, 2003

(65) Prior Publication Data

US 2005/0138922 A1    Jun. 30, 2005

(51) Int. Cl.
*F01N 3/04* (2006.01)

(52) U.S. Cl. .............. 60/310; 60/274; 60/298; 60/311; 60/320; 60/321; 95/156; 95/163

(58) Field of Classification Search ........... 60/274, 60/279, 281, 286, 288, 295, 296, 297, 298, 60/310, 311, 320, 321, 324; 95/150, 151, 95/154, 155, 156, 162, 163, 166
See application file for complete search history.

(56) References Cited

U.S. PATENT DOCUMENTS

| | | | |
|---|---|---|---|
| 3,353,335 A * | 11/1967 | Caballero ............... | 95/224 |
| 3,353,336 A | 11/1967 | Caballero | |
| 3,615,074 A * | 10/1971 | Cook ............... | 261/138 |
| 3,712,031 A | 1/1973 | Santa Cruz | |
| 3,742,682 A | 7/1973 | Ligutom | |
| 4,301,652 A | 11/1981 | Sohda et al. | |
| 4,399,107 A * | 8/1983 | Bose ............... | 422/170 |
| 4,821,513 A * | 4/1989 | Pickering ............... | 60/283 |
| 4,949,539 A | 8/1990 | Hsu et al. | |
| 5,121,602 A | 6/1992 | McCorvey | |
| 5,123,936 A | 6/1992 | Stone et al. | |
| 5,125,230 A | 6/1992 | Leonard | |
| 5,367,889 A | 11/1994 | Lanyon | |
| 5,407,456 A | 4/1995 | Tseng | |
| 5,464,458 A | 11/1995 | Yamamoto | |
| 5,518,696 A * | 5/1996 | Jain ............... | 422/171 |
| 5,857,324 A * | 1/1999 | Scappatura et al. ...... | 60/274 |
| 6,032,462 A | 3/2000 | Chu | |
| 2002/0059794 A1 | 5/2002 | Sundholm | |

* cited by examiner

*Primary Examiner*—Binh Q. Tran
(74) *Attorney, Agent, or Firm*—Berenato, White & Stavish

(57) ABSTRACT

An exhaust gas purifying system and a method for purifying exhaust gas of combustion engines. The system includes a hollow casing, a converter chamber disposed within the casing, spray nozzles for spraying a scrubbing liquid into the converter chamber for forming a moisture-saturated exhaust gas in order to remove pollutants dispersed in the exhaust gas and purifying the exhaust gas, a cooling container disposed within the casing and defining a cooling jacket enveloping the converter chamber for cooling thereof, a primary circulating reservoir fluidly connected to the converter chamber for receiving the moisture-saturated exhaust gas and separating the purified exhaust gas from a waste liquid and for cleaning the scrubbing liquid from the pollutants dispersed in the waste liquid for reuse, and a secondary circulating reservoir fluidly connected to the primary circulating reservoir for receiving the cleaned scrubbing liquid and supplying the scrubbing liquid to the liquid spray nozzles.

69 Claims, 3 Drawing Sheets

EXHAUST GAS PURIFYING SYSTEM

BACKGROUND OF THE INVENTION

1. Field of the Invention

The present invention relates to exhaust gas purification systems, and more particularly to an exhaust gas purifying system and a method for purifying exhaust gas of combustion engines wherein the exhaust gas of the engine is passed through a spray of scrubbing liquid.

2. Description of the Prior Art

The combustion of a petrochemical fuel in combustion engines generally involves the reaction of air with various hydrocarbons which comprise the fuel. As air is chiefly comprised of oxygen and nitrogen gasses, the resultant products include oxides of nitrogen and carbon and unburned hydrocarbons, the latter generally comprising particulate matter contributing to what is generally referred to as "smog". As petroleum based fuels generally contain sulfur, oxides of sulfur are typically also present in the combustion products.

The oxides of carbon are carbon monoxide and carbon dioxide. Carbon monoxide is undesirable as it is poisonous. Carbon dioxide is undesirable as it is a "greenhouse gas" generally thought to be a primary contributor to global warming.

Pollution from the exhaust of motor vehicles has caused serious air quality problems, especially in populated areas with heavy traffic. Such pollution has caused the "greenhouse" effect, and the pollution and toxic particles from such exhaust is everywhere. Vehicle exhaust is one of the major causes of such poor air quality, especially in large cities.

Many countries have adopted different policies and restrictions on vehicles in order to improve the air quality, such as using unleaded gasoline, low-sulphur diesel fuel and requiring the use of catalytic converters in an exhaust system of the engine.

In the conventional system for purifying exhaust gas, the catalytic converter, for example, is provided on an intermediate part of an exhaust system of the engine so that CO, HC and $NO_x$ as harmful components contained in the exhaust gas can be reduced. However, the catalytic converter only reduces the amount of the nitrogen oxides, unburned hydrocarbons and carbon monoxide, it produces nitrous oxide or laughing gas believed to be 300% more harmful than carbon monoxide, and does not have the function for collecting carbon as a harmful component contained in the exhaust gas discharged from the motor vehicles. Accordingly, even with the use of a catalytic converter a significant pollution problem still exists as catalytic converter works only when it becomes hot. Thus, there is a need for an exhaust gas purifying system and method that would significantly reduce the amount of carbon dioxide emitted to the atmosphere, neutralize acids present in exhaust gasses, and remove particulate matter ("smog") from exhaust gasses.

SUMMARY OF THE INVENTION

The present invention provides a novel arrangement of an exhaust gas purifying system and a method for purifying exhaust gas of combustion engines. The gas purifying system of the present invention may be installed on various land conveyance vehicles such as automobiles, trucks, buses, tractors, construction equipment, or the like. The system may also be installed on ocean going vessels, or any other machinery which uses combustion engines. It is contemplated that the system may further be installed on exhaust systems of combustion engines used in various industry applications, such as generators, compressors, and mechanical conveyance systems powered by engines or the like. Furthermore, the system's use is not limited to combustion engines. For instance, the present invention may be installed on various smokestacks from industry which may not have an engine as part of the system or any other exhaust system which emits pollutants, such as a furnace smokestack. Moreover, it is appreciated that the present invention may be utilized in conjunction with any system having an exhaust which produces noxious pollutants. Other applications for the present invention include HVAC systems.

According to an exemplary embodiment of the present invention, the exhaust gas purifying system may include a hollow casing, an exhaust gas converter chamber disposed within the casing and being in fluid communication with an exhaust gas discharge pipe of the engine for permitting a flow of the exhaust gas through the exhaust gas converter chamber, at least one liquid spray nozzle for spraying a scrubbing liquid under pressure into the exhaust gas converter chamber for forming a moisture-saturated exhaust gas in order to remove pollutants dispersed in the exhaust gas and purifying said exhaust gas, a cooling container disposed within the casing and defining a cooling jacket enveloping the exhaust gas converter chamber to cool the exhaust gas converter chamber, and a primary circulating reservoir fluidly connected to the exhaust gas converter chamber for receiving the moisture-saturated exhaust gas. The moisture-saturated exhaust gas includes a waste liquid and a purified exhaust gas in the form of substantially cleaned air. The cooling jacket is filled with a coolant. Preferably the coolant in the cooling jacket is the scrubbing liquid. The primary circulating reservoir is provided for separating the purified exhaust gas from the waste liquid and for cleaning the scrubbing liquid from the pollutants dispersed in the waste liquid for reuse.

According to an aspect of the present invention, the exhaust gas purifying system of the present invention may further comprise a secondary circulating reservoir fluidly connected to the primary circulating reservoir for receiving the cleaned scrubbing liquid therefrom and supplying the scrubbing liquid to the at least one liquid spray nozzle. Preferably, the scrubbing liquid is water.

The system for purifying exhaust gas further comprises at least one discharge opening provided for introducing the purified exhaust gas into the hollow casing from the primary circulating reservoir through an air cooling/heating apparatus provided for selectively cooling or heating the purified exhaust gas prior to entering the hollow casing. A portion of the purified exhaust gas passing through the air cooling/heating apparatus is injected into the exhaust gas converter chamber.

The primary circulating reservoir comprises a separation tank fluidly connected to the exhaust gas converter chamber for receiving the moisture-saturated exhaust gas and provided for separating the purified exhaust gas from the waste liquid and for cleaning the scrubbing liquid by separating the scrubbing liquid from the pollutants dispersed in said waste liquid by gravity. The pollutants include a lightweight pollutants adapted float on a surface of said waste liquid in the separation tank and a heavyweight pollutants adapted to settle by gravity in a lower section of the separation tank. A space within the separation tank above the surface of the waste liquid is provided to be occupied with the purified exhaust gas.

The primary circulating reservoir further comprises a lightweight pollutants storage tank fluidly connected to the separation tank and provided for receiving the lightweight pollutants from the separation tank transferred from the surface of the waste liquid in the separation tank by a suction pump. The lightweight pollutants storage tank is detachably connected to a lightweight pollutants disposal container through a drain valve provided for selectively draining the lightweight pollutants into the lightweight pollutants disposal container.

Preferably, the system for purifying exhaust gas further comprises a waste disposal container fluidly connected to the separation tank through a drain valve provided for selectively draining the heavyweight pollutants into the waste disposal container from the separation tank.

The primary circulating reservoir further comprises a purified liquid tank fluidly connected to the separation tank through a first opening therebetween, and a circulation tank fluidly connected to the purified liquid tank through a second opening therebetween.

The secondary circulating reservoir comprises a scrubbing liquid reserve tank containing a certain amount of a fresh scrubbing liquid, a primary clean scrubbing liquid tank, and a secondary clean scrubbing liquid tank. The scrubbing liquid reserve tank is fluidly connected to the circulation tank through an access valve provided for selectively replenishing the circulation tank with the fresh scrubbing liquid from the scrubbing liquid reserve tank. The primary clean scrubbing liquid tank is fluidly connected to the circulation tank at the bottom portion thereof to siphon the clean scrubbing liquid from the circulation tank into the primary clean scrubbing liquid tank. Before entering the primary clean scrubbing liquid tank, the scrubbing liquid is cooled in a liquid cooling apparatus. The secondary clean scrubbing liquid tank is, in turn, fluidly connected to the primary clean scrubbing liquid tank for further circulation.

The clean scrubbing liquid from the secondary clean scrubbing liquid tank is supplied to the at least one liquid spray nozzle and to a discharge aperture filling the cooling jacket of the cooling container.

The purified exhaust gas is discharged into the ambient atmosphere through a vent opening provided on a top portion of the hollow casing.

In operation, the exhaust gas purifying system of the present invention is activated once an ignition key is switched on, and deactivated when the engine is turned off.

Therefore, the exhaust gas purifying system in accordance with the present invention represents a novel arrangement that providing highly effective and versatile apparatus for purifying exhaust gas of the combustion engines.

BRIEF DESCRIPTION OF THE DRAWINGS

Other aspects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
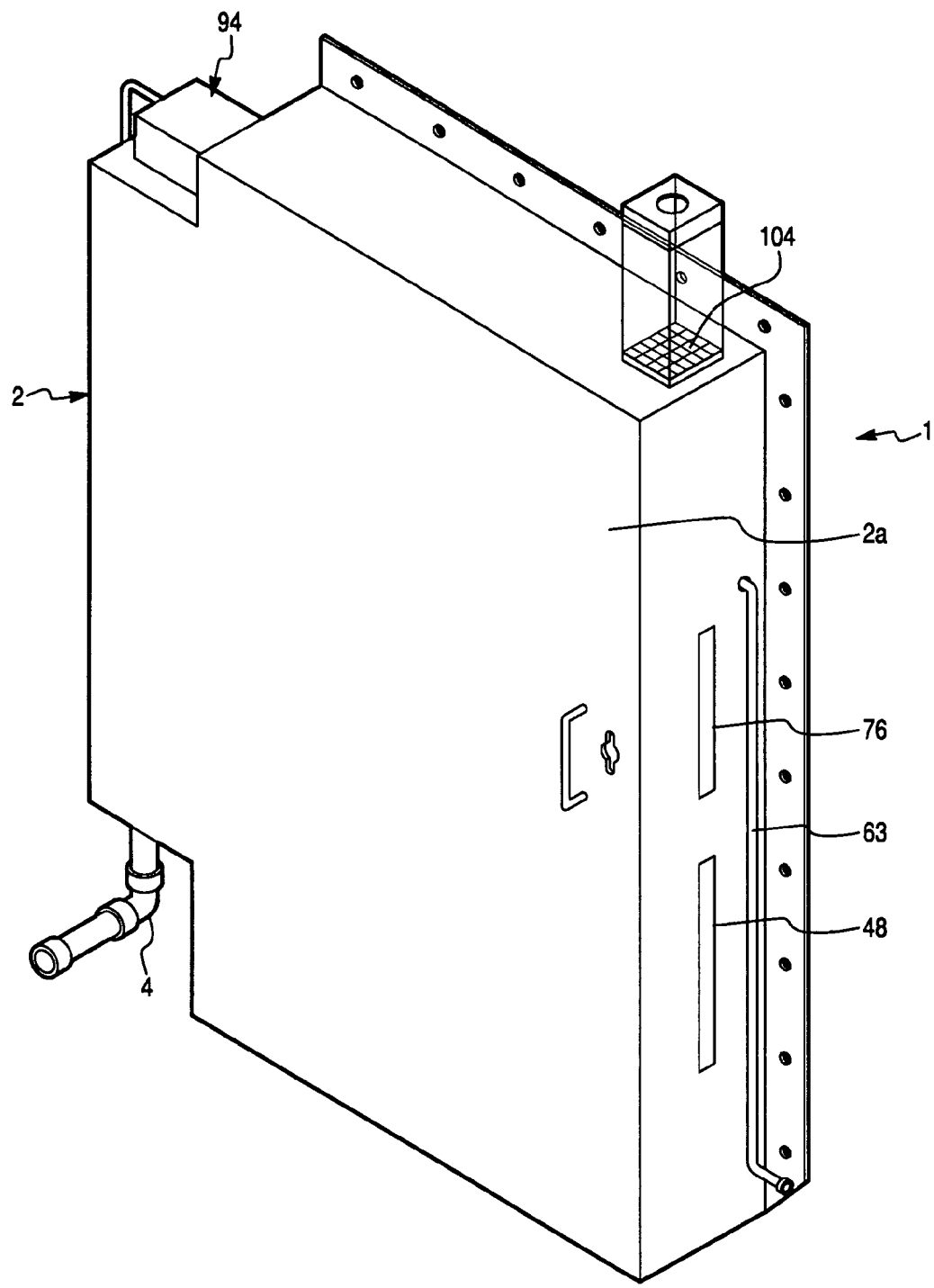
FIG. 1 is a perspective view of an exhaust gas purifying system in accordance with the preferred exemplary embodiment of the present invention.
Figure 2:
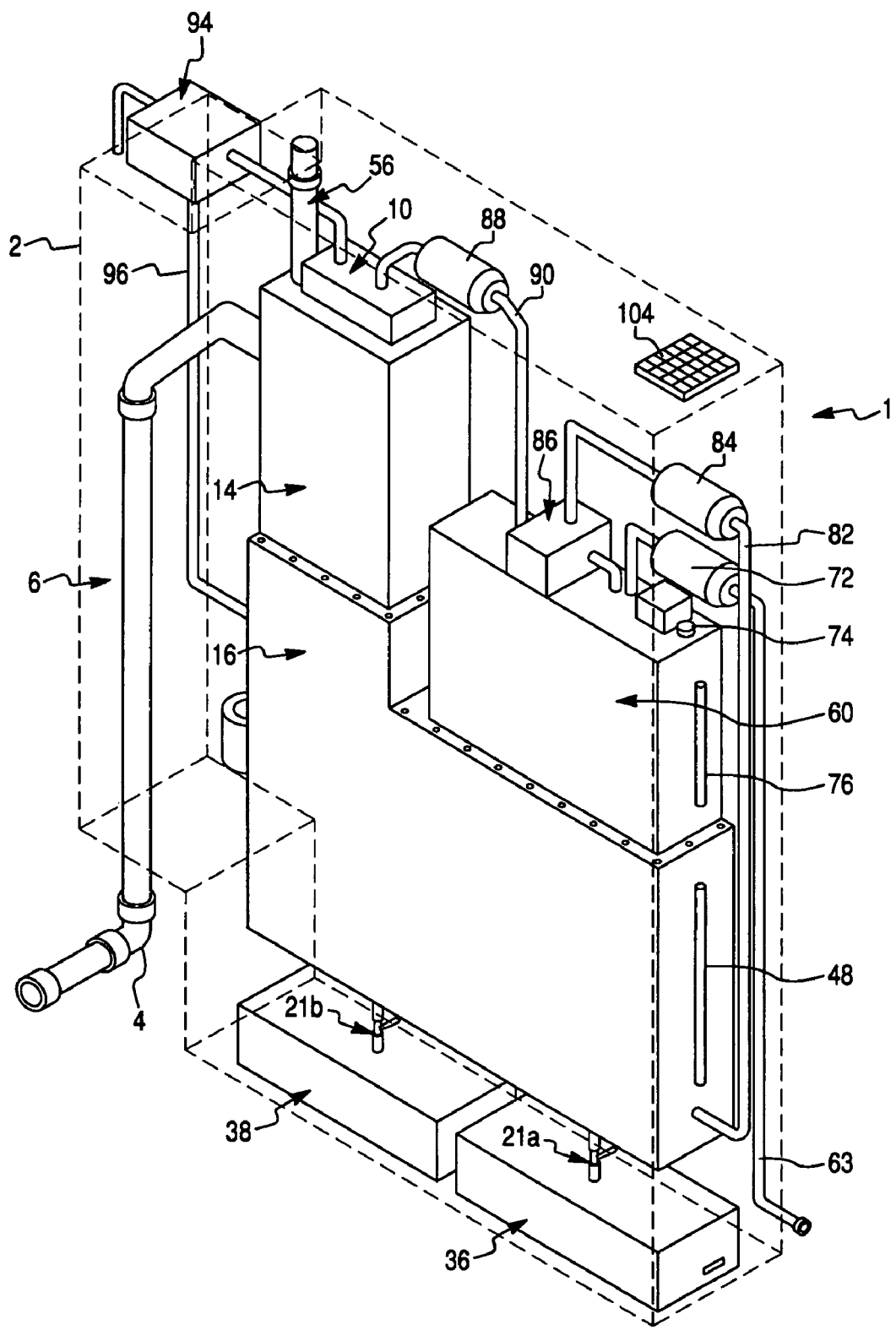
FIG. 2 is a perspective view of the exhaust gas purifying system in accordance with the preferred exemplary embodiment of the present invention (a casing 2 is shown in a phantom line)
Figure 3:
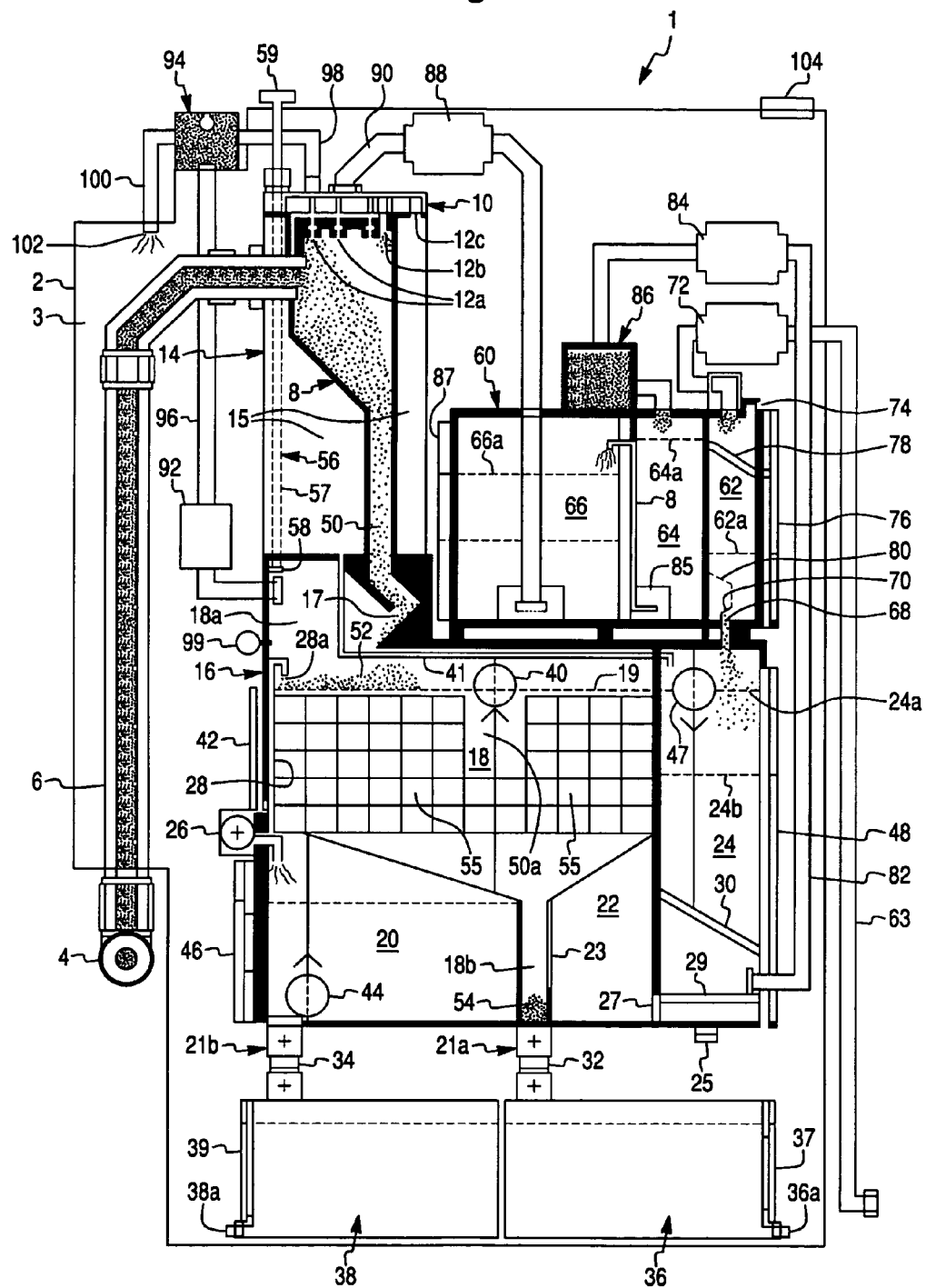
FIG. 3 is a schematic view of the exhaust gas purifying system in accordance with the preferred exemplary embodiment of the present invention.

FIGS. 1–3 of the drawings illustrate the preferred exemplary embodiment of an exhaust gas purifying system, generally indicated at 1, for purifying exhaust gas discharged from a combustion engine (not shown), such as an internal combustion engine, jet engine, etc. The combustion engine using the exhaust gas purifying system of the present invention may either stationary device, such as generator engine, or installed on any appropriate vehicle. The gas purifying system of the present invention may be installed on various land conveyance vehicles such as automobiles, trucks, buses, tractors, construction equipment, or the like. The gas purifying system of the present invention may also be installed on ocean going vessels, trains, or any other machinery which uses combustion engines. It is contemplated that the system may further be installed on exhaust systems of combustion engines used in various industry applications, such as generators, compressors, and mechanical conveyance systems powered by engines or the like. Furthermore, the system's use is not limited to combustion engines. For instance, the present invention may be installed on various smokestacks from industry which may not have an engine as part of the system or any other exhaust system which emits pollutants, such as a furnace smokestack. Moreover, it is appreciated that the present invention may be utilized in conjunction with any system having an exhaust which produces noxious pollutants. Other applications for the present invention include HVAC systems. Needless to say, the aforementioned list of various applications of the present invention is merely provided for illustrating exemplary uses of the present invention and should not be deemed as limiting any other unforeseen use the present invention may have. Moreover, the purifying system of the present invention may be built-in unit built into an exhaust system of a new vehicle or equipment during the manufacturing thereof, or a "stand-alone" unit attached to during aftermarket conversion.

The exhaust gas purifying system 1 of the present invention is shown in detail in FIGS. 2 and 3, comprises a hollow casing 2 housing components of the exhaust gas purifying system 1 and provided with a tail pipe adaptor 4 provided for attaching an exhaust gas pipe of the combustion engine (not shown) to an inlet pipe 6 of the system 1. The casing 2 of the exhaust gas purifying system 1 defines a cavity 3 therewithin. The casing 2 is equipped with strategically located service doors for easy maintenance (a front service door 2a providing an access to the cavity 3 within the casing 2 is illustrated in FIG. 1).

As further illustrated in FIGS. 2 and 3, the exhaust gas purifying system 1 of the present invention further comprises an exhaust gas converter chamber 8 receiving the exhaust gas from the I.C. engine via the inlet pipe 6. A top portion of the exhaust gas converter chamber 8 is provided with a spray head 10 having a plurality of liquid spray nozzles 12a and at least one air nozzle 12b. The spray head 10 is provided to be supplied with a scrubbing liquid, such as water, under pressure. In accordance with the preferred embodiment of the present invention, a water is employed as the scrubbing liquid. However, it will be appreciated that any appropriate scrubbing liquid known by those skilled in the art may be used in the exhaust gas purifying system 1 of the present invention.

The pressurized scrubbing liquid is sprayed by the spray nozzles 12a of the spray head 10 into the exhaust gas converter chamber 8 to produce a mixture of the exhaust gas and fine mist of the scrubbing liquid forming a moisture-saturated exhaust gas 50 including a waste liquid 50a and a purified exhaust gas. The pressurized jets of the scrubbing liquid capture and remove pollutants dispersed in the exhaust gas, such as sulfur dioxide, nitrogen oxides, smoke, soot and other harmful components contained in the exhaust gas, thus thoroughly purifying the exhaust gas. It will be appreciated that the purified exhaust gas produced in the exhaust gas converter chamber 8 of the exhaust gas purifying system 1 of the present invention is substantially a cleaned air.

It should be noted that the waste liquid 50a includes a lightweight pollutants 52 having density smaller than a density of the scrubbing liquid, such as trace amounts of oil, unburned fuel, grease and fine particles, and a heavyweight pollutants 54 having density higher than the density of the scrubbing liquid, such as particulate matters.

Moreover, the exhaust gas converter chamber 8 is enclosed in a cooling container 14 filled with a coolant and defining a cooling jacket 15 adapted to cool and control temperature within the exhaust gas converter chamber 8, and to prevent heat build-up. As illustrated in FIG. 3, the cooling jacket 15 envelops the exhaust gas converter chamber 8. In accordance with the preferred embodiment of the present invention, the scrubbing liquid is used as the coolant in the cooling container 14. It will be appreciated that any other appropriate coolant may be used in the cooling container 14. Further in accordance with the preferred embodiment of the present invention, the spray head 10 further has a discharge aperture 12c adapted to introduce the coolant, preferably the scrubbing liquid into the cooling container 14.

As further illustrated in FIG. 2, beneath the exhaust gas converter chamber 8 there is a primary circulating reservoir 16 fluidly connected to the converter chamber 8. For this purpose, the primary circulating reservoir 16 has an inlet opening 17 in a top portion thereof for introducing the moisture-saturated exhaust gas 50 into the primary circulating reservoir 16. The primary circulating tank 16 is provided for separation of the purified exhaust gas and the waste liquid 50a entering the primary circulating tank 16 from the exhaust gas converter chamber 8 from both the lightweight and heavyweight pollutants 52 and 54.

The primary circulating reservoir 16 includes a separation tank 18, a lightweight pollutants storage tank 20, a purified liquid tank 22, and a circulation tank 24.

The separation tank 18 is disposed directly beneath the exhaust gas converter chamber 8 and is fluidly connected to a downstream end of the converter chamber 8 through the inlet opening 17 in a top portion of the separation tank 18, as illustrated in FIG. 3, so that the waste liquid 50a and the purified exhaust gas enter the separation tank 18 by gravity. Preferably, to monitor a level of the waste liquid 50a inside the separation tank 18, a water level indicator 42 is provided outside the separation tank 18.

As the waste liquid 50a collects in the separation tank 18, the gravity separates the scrubbing liquid from the lightweight pollutants 52 and the heavyweight pollutants 54. More specifically, the lightweight pollutants 52, being lighter than the scrubbing liquid, float on a surface 19 of the waste liquid 50a in the separation tank 18, while the heavyweight pollutants 54 within the waste liquid 50a settle under forces of gravity in a relatively narrow, funnel-shaped lower section 18b of the separation tank 18. A space 18a within the separation tank 18 above the surface 19 of the waste liquid 50a is filled with the purified exhaust gas thoroughly cleaned by the scrubbing liquid.

To minimize sloshing of the waste liquid 50a inside the separation tank 18, thin metal or plastic sheets 55 arranged in grids are installed inside the separation tank 18.

In order to prevent the space 18a within the separation tank 18 from over-pressurizing by the purified exhaust gas, the exhaust gas purifying system 1 of the present invention may include a pressure relief device 56 including a pipe 57 having an inlet end provided with a pressure relief valve 58 disposed in the space 18a within the separation tank 18, and an outlet end 59 open to an ambient atmosphere.

As shown in FIG. 3, the lower section 18b of the separation tank 18 is disposed atop a first drain valve 21a that allows the heavyweight pollutants 54 to flow out of the lower section 18b of the separation tank 18 by gravity during scheduled service periods. Preferably, the exhaust gas purifying system 1 of the present invention includes a waste disposal container 36 connected to the first drain valve 21a of the separation tank 18 through a connector 32 to receive and store the heavyweight pollutants 54. Preferably, in order to visually monitor a level of the heavyweight pollutants 54 inside the waste disposal container 36, a liquid level indicator 37 is provided outside the waste disposal container 36. The waste disposal container 36 can be detached from the separation tank 18 above by disengaging the connector 32. Once disconnected, the heavyweight pollutants 54 can be safely disposed of in specified waste disposal stations.

The lightweight pollutants storage tank 20 is fluidly connected to the separation tank 18, and is adapted to store and transport the lightweight pollutants 52 transferred from the separation tank 18. Preferably, the lightweight pollutants 52 are transferred from the surface 19 of the waste liquid 50a in the separation tank 18 by means of a suction pump 26 through a piping 28. As illustrated in FIG. 3, the piping 28 has an inlet 28a provided adjacent to the surface 19 of the waste liquid 50a in the separation tank 18 in order to skim the lightweight pollutants 52 from the surface 19 of the waste liquid 50a, and an outlet open in the lightweight pollutants storage tank 20. When a level of the surface 19 of the waste liquid 50a in the separation tank 18 rises up to a certain predetermined level, a mechanical float 40 activates the suction pump 26 and siphons out the floating lightweight pollutants 52 through the piping 28 into the lightweight pollutants storage tank 20. It will be appreciated that any appropriate device for measuring the surface level of a liquid in a tank may be employed instead of the mechanical float 40. Preferably, in order to visually monitor a level of the lightweight pollutants 52 inside the storage tank 20, a liquid level indicator 46 is provided outside the storage tank 20.

As further shown in FIG. 3, a bottom portion of the lightweight pollutants storage tank 20 includes a second drain valve 21b that allows the lightweight pollutants 52 to flow out of the lightweight pollutants storage tank 20 by gravity during scheduled service periods.

Preferably, the exhaust gas purifying system 1 of the present invention includes a lightweight pollutants disposal container 38 connected to the second drain valve 21b of the lightweight pollutants storage tank 20 through a connector 34 to receive and store the lightweight pollutants 52. The lightweight pollutants disposal container 38 can be detached from the lightweight pollutants storage tank 20 above by disengaging the connector 34. Once disconnected, the lightweight pollutants 52 can be safely disposed of in specified oil disposal stations through a disposal drain valve 38a.

Preferably, the lightweight pollutants storage tank 20 includes a mechanical float 44 adapted to activate the second drain valve 21*b*. When a level 20*a* of the lightweight pollutants 52 in the lightweight pollutants storage tank 20 rises up to a certain predetermined level, the mechanical float 44 automatically opens the second drain valve 21*b* allowing the lightweight pollutants 52 to drain by gravity into the lightweight pollutants disposal container 38 below. It will be appreciated that any appropriate device for measuring the surface level of a liquid in a tank may be employed instead of the mechanical float 44. Preferably, in order to visually monitor a level of the lightweight pollutants 52 inside the lightweight pollutants disposal container 38, a liquid level indicator 39 is provided outside the lightweight pollutants disposal container 38.

The purified liquid tank 22 is disposed adjacent to the separation tank 18, and is in fluid communication with the separation tank 18 through a first opening 23 therebetween. Preferably, the first opening 23 is provided with a liquid filter for further purifying the waste liquid 50*a* entering the purified liquid tank 22 from the separation tank 18 for reuse by filtering the suspended particles.

The purified liquid tank 22, in turn, is in fluid communication with the circulation tank 24 through a second opening 27 therebetween. Preferably, the second opening 27 is provided with a liquid filter for filtering liquid entering the circulation tank 24 from the purified liquid tank 22. Further preferably, the circulation tank 24 is provided with a liquid filter 29 adjacent to the second opening 27 and a liquid filter 30 spaced from the liquid filter 29. Thus, the scrubbing liquid entering the circulation tank 24 is substantially clean of the pollutants and ready for reuse.

The circulation tank 24 may be provided with a third drain valve 25 at a bottom portion thereof. Preferably, the exhaust gas purifying system 1 of the present invention further includes a tubing 41 fluidly interconnecting a bottom portion of the cooling container 14 with a top portion of the circulation tank 24, thus providing a constant circulation of the cooling liquid in the cooling jacket 15.

As illustrated in FIGS. 2 and 3, the exhaust gas purifying system 1 of the present invention further includes a secondary circulating reservoir 60 fluidly connected to the primary circulating reservoir 16. More specifically, the secondary circulating reservoir 60 includes a scrubbing liquid reserve tank 62 and a clean scrubbing liquid container comprising a primary clean scrubbing liquid tank 64, and a secondary clean scrubbing liquid tank 66.

The scrubbing liquid reserve tank 62 contains a certain amount of the fresh scrubbing liquid. The scrubbing liquid reserve tank 62 can be replenished by attaching a built-in supply pipe 63 to an external scrubbing liquid source (not shown) and activating a first supply pump 72 to siphon the scrubbing liquid into the reserve tank 62. The reserve tank 62 may also be replenished manually by opening an inlet port 74 on top of the reserve tank 62 and pouring fresh supply of the scrubbing liquid into it. To monitor a level 62*a* of the scrubbing liquid inside the reserve tank 62, a liquid level indicator 76 is provided outside the reserve tank 62. In order to insure a purity of the fresh scrubbing liquid supplied to the reserve tank 62, a liquid filter 78 is provided with the reserve tank 62 above the level 62*a* of the scrubbing liquid inside the reserve tank 62. In case the scrubbing liquid employed is the water, the reserve tank 62 may be equipped with a water softener 80 if a hard water is used as the scrubbing liquid.

The scrubbing liquid reserve tank 62 is fluidly connected to the circulation tank 24 by a communication passage 68 provided with an access valve 70 for selectively opening or closing the communication passage 68. Preferably, the circulation tank 24 includes a mechanical float 47 adapted to activate the access valve 70. When a level 24*a* of the scrubbing liquid in the circulation tank 24 drops to a certain predetermined level 24*b*, the mechanical float 48 automatically opens the access valve 70 allowing the fresh scrubbing liquid to replenish the circulation tank 24 below. It will be appreciated that any appropriate device for measuring the surface level of a liquid in a tank may be employed instead of the mechanical float 47. Preferably, in order to visually monitor the level 24*a* of the scrubbing liquid inside the circulation tank 24, a liquid level indicator 48 is provided outside the circulation tank 24.

The primary clean scrubbing liquid tank 64 is fluidly connected to the circulation tank 24 at the bottom portion thereof above the liquid filter 29 through a communication pipe 82 and a second supply pump 84 adapted to siphon the clean scrubbing liquid under pressure from the circulation tank 24 into the primary clean scrubbing liquid tank 64. Before entering the primary clean scrubbing liquid tank 64, the scrubbing liquid is cooled in a liquid cooling apparatus 86 disposed, preferably, adjacent to the primary clean scrubbing liquid tank 64, such as mounted on a top surface of the secondary circulating reservoir 60, as shown in FIGS. 2 and 3. It will be appreciated that any appropriate liquid cooling apparatus known in the art may be employed.

The secondary clean scrubbing liquid tank 66 is, in turn, fluidly connected to the primary clean scrubbing liquid tank 64 through a supply tubing 83 and a liquid filter 85 for further filtering the scrubbing liquid prior to entering the secondary clean scrubbing liquid tank 66 for further circulation. Moreover, the scrubbing liquid flows from the primary clean scrubbing liquid tank 64 into the secondary clean scrubbing liquid tank 66 by gravity as a liquid level 64*a* in the primary clean scrubbing liquid tank 64 is always higher than a liquid level 66*a* in the secondary clean scrubbing liquid tank 66. The level 66*a* of the scrubbing liquid inside the secondary clean scrubbing liquid tank 66 may be visually monitored by an optional liquid level indicator 87 mounted outside the secondary clean scrubbing liquid tank 66.

The clean scrubbing liquid from the secondary clean scrubbing liquid tank 66 is supplied to the liquid spray nozzles 12*a* and to the discharge aperture 12*c* of the spray head 10 under pressure by a third, high pressure liquid pump 88 through a supply piping 90.

The exhaust gas purifying system 1 of the present invention further includes an air exhaust pump 92 provided to draw the purified exhaust gas from the space 18*a* within the separation tank 18 into an air cooling/heating apparatus 94 through a pipe 96. The purified exhaust gas is treated in the air cooling/heating apparatus 94 and divided into generally two opposite flows. A portion of the purified exhaust gas treated in the air cooling/heating apparatus 94 is re-directed back into the exhaust gas converter chamber 8 through a pipe 98 and the air nozzle 12*b* of the spray head 10, and the rest of the treated purified exhaust gas is directed into the cavity 3 of the hollow casing 2 through a discharge opening 102 in an pipe 100.

The air cooling/heating apparatus 94 is provided to selectively cool or heat the purified exhaust gas depending on a temperature within the cavity 3 of the casing 2 monitored by a temperature sensor 99. It will be appreciated that any appropriate air cooling/heating apparatus known in the art may be employed.

During the summer or hot weather periods, the air cooling/heating apparatus 94 cools the purified exhaust gas. The cooled purified exhaust gas supplied into the exhaust gas converter chamber 8 and the cavity 3 of the casing 2 helps to cool the exhaust gas converter chamber 8 and prevent the heat build-up, thus enhancing the process of purifying the exhaust gas.

During the winter or cold weather periods, the air cooling/heating apparatus 94 heats the purified exhaust gas. The heated purified exhaust gas supplied into the cavity 3 of the casing 2 acts as insulation, preventing the circulating scrubbing liquid, such as water, from freezing. In extremely cold periods, a mild anti-freeze agent may be introduced into the water to keep it from freezing.

Furthermore, the exhaust gas purifying system 1 of the present invention includes a vent opening 104 provided on a top portion of the casing 2 to discharge the purified exhaust gas into the ambient atmosphere from the hollow cavity 3 of the casing 2.

While the operation of this invention should be obvious from the foregoing description, it will be restated for clarity.

From the above description, it is understood the exhaust gas purifying system 1 of the present invention fits in the exhaust system and scrubs pollutants from the exhaust gas in an efficient manner. The scrubbing liquid is circulated in a continuous loop from the secondary circulating reservoir 60 to the exhaust gas converter chamber 8 and back to the secondary circulating reservoir 60 through the primary circulating reservoir 16.

First, it is assumed that the scrubbing liquid, e.g. water, is supplied to the scrubbing liquid reserve tank 62 from the external source by the first supply pump 72 through the built-in supply pipe 63. The water in the reserve tank 62 fills the circulation tank 24. The water from the circulation tank 24 is cooled and supplied to the primary and secondary clean scrubbing liquid tanks 64 and 66 by the second supply pump 84 through the communication pipe 82 and the liquid cooling apparatus 86.

In operation, once an ignition key is switched on (before the engine is started), the third, high pressure liquid pump 88 and the second supply pump 84 are activated and start the water circulation throughout the exhaust gas purifying system 1. The third, high pressure liquid pump 88 starts drawing the cold water (cooled by the liquid cooling apparatus 86) from the secondary liquid tank 66 via the supply piping 90 and supply the water under pressure to the liquid spray nozzles 12a and to the discharge aperture 12c of the spray head 10. Simultaneously, the second supply pump 84 starts drawing water from the bottom of the circulation tank 24, which replenishes the reserve tank 62. The cold water from the discharge aperture 12c fills the cooling jacket of the cooling container 14. At the same time, the water at the bottom of the cooling container 14 is siphoned to the circulation tank 24 in order to provide a constant circulation of the cold water in the cooling jacket 15, thus continuously cooling the exhaust gas converter chamber 8.

Once the engine is started, combustion occurs and exhaust gas is generated and forced out of engine cylinders through the exhaust pipe. From the exhaust pipe, the exhaust gas from the engine enters the exhaust gas converter chamber 8 via the inlet pipe 6.

As the exhaust gas enters the exhaust gas converter chamber 8 continuously cooled by the surrounding cooling jacket 15, it is instantaneously sprayed by the pressurized jets of the water from the spray nozzles 12a of the spray head 10 producing the mixture of the exhaust gas and the fine mist of the water that captures and remove the pollutants dispersed in the exhaust gas, such as sulfur dioxide, nitrogen oxides, smoke, soot and other harmful components contained in the exhaust gas, thus thoroughly purifying the exhaust gas. Preferably, water jet sprayed out the nozzle 12a is intended to have a flat linear fan shape which perpendicularly intersects the gas flow entering the converter chamber 8 from the inlet pipe 6 such that an optimal intersection with respect to the gas flow and scrubbing water is accomplished.

From the downstream end of the converter chamber 8 the purified exhaust gas and the waste water 50 enter into the separation tank 18 where gravity separates the water from the lightweight pollutants 52 the heavyweight pollutants 54.

At the same time, the purified exhaust gas from the space 18a within the separation tank 18 is drawn into the air cooling/heating apparatus 94 through the pipe 96 by the air exhaust pump 92. The purified exhaust gas is either cooled or heated in the air cooling/heating apparatus 94 depending on a reading of the temperature sensor 99. If the temperature within the cavity 3 of the casing 2 is above a predetermined value, such as during the summer or hot weather periods, the air cooling/heating apparatus 94 cools the purified exhaust gas. The cooled purified exhaust gas is then supplied into the exhaust gas converter chamber 8 through the air nozzle 12b of the spray head 10 and the cavity 3 of the hollow casing 2 through the discharge opening 102 in the pipe 100, helping to cool the exhaust gas converter chamber 8 and prevent the heat build-up, thus enhancing the process of purifying the exhaust gas. Conversely, if the temperature within the cavity 3 of the casing 2 is below a predetermined value, such as during the winter or cold weather periods, the air cooling/heating apparatus 94 heats the purified exhaust gas. The heated purified exhaust gas is then supplied into the hollow cavity 3 of the casing 2 through the discharge opening 102 in the pipe 100, and, possibly, to the converter chamber 8 through the air nozzle 12b of the spray head 10, acting as insulation, preventing the circulating water, from freezing.

From the cavity 3 of the casing 2 the purified exhaust gas is discharged into the ambient atmosphere through the vent opening 104 provided on the top portion of the casing 2.

Within the separation tank 18 where gravity separates the water from the pollutants, the heavyweight pollutants 54 settle in the lower section 18b of the separation tank 18, while the lightweight pollutants 52 float on the surface 19 of the waste water 50 in the separation tank 18.

When the level of the surface 19 of the waste liquid 50a in the separation tank 18 rises up to a certain predetermined level, the mechanical float 40 activates the suction pump 26 and siphons out the floating lightweight pollutants 52 through the piping 28 into the lightweight pollutants storage tank 20. Similarly, when the level 20a of the lightweight pollutants 52 in the lightweight pollutants storage tank 20 rises up to the certain predetermined level, the mechanical float 44 automatically opens the drain valve 21b allowing the lightweight pollutants 52 to drain by gravity into the lightweight pollutants disposal container 38 below. Once the liquid level indicator 39 shows that the disposal container 38 is full, the disposal container 38 is detached from the storage tank 20 by disengaging the connector 34, and the lightweight pollutants 52 are disposed of in the specified oil disposal stations.

In the substantially same way, periodically the drain valve 21a allowing the heavyweight pollutants 54 to drain by gravity into the waste disposal container 36 below. Once the liquid level indicator 37 shows that the waste disposal container 36 is full, the waste disposal container 36 is detached from the separation tank 18 by disengaging the connector 32, and the heavyweight pollutants 54 are disposed of in the specified oil disposal stations through a disposal drain valve 36a.

The cleaned waste water free of the lightweight and heavyweight pollutants 52 and 54, flows by gravity from the separation tank 18 to the purified liquid tank 22 through the first opening 23 provided with the liquid filter for further purifying the water.

Then, the cleaned water flows by gravity from the purified liquid tank 22 to the circulation tank 24 through the second opening 27 provided with the liquid filter, and further through the liquid filter 29, thus thoroughly cleaning the waste water 50 of the pollutants for reuse.

Finally, the cleaned water is drawn from the circulation tank 24 by the second supply pump 84 into the primary clean scrubbing liquid tank 64 while being cooled in the liquid cooling apparatus 86, thus closing the water circulation loop. If the level 24a of the water in the circulation tank 24 drops to the certain predetermined level 24b, the mechanical float 48 automatically opens the access valve 70 to replenish the circulation tank 24 with the fresh water.

The water circulation inside the exhaust gas purifying system continues while the engine is operating. It stops automatically after the engine is turned off.

Therefore, the exhaust gas purifying system in accordance with the present invention represents a novel arrangement for highly efficiently purifying the exhaust gas emitted by the combustion engines, and disposing the harmful pollutants.

The foregoing description of the preferred embodiment of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A system for purifying exhaust gas discharged from a combustion engine, said system comprising:

an exhaust gas converter chamber being in fluid communication with an exhaust gas discharge pipe of the engine for permitting a flow of said exhaust gas through said exhaust gas converter chamber;

at least one liquid spray nozzle for spraying a scrubbing liquid into said exhaust gas converter chamber for forming a moisture-saturated exhaust gas in order to remove pollutants dispersed in said exhaust gas and purifying said exhaust gas;

said moisture-saturated exhaust gas including a waste liquid and a purified exhaust gas in the form of a substantially cleaned air;

a cooling container defining a cooling jacket enveloping said exhaust gas converter chamber, said cooling jacket filled with a coolant and provided to cool said exhaust gas converter chamber;

a primary circulating reservoir fluidly connected to said exhaust gas converter chamber for receiving said moisture-saturated exhaust gas and provided for separating said purified exhaust gas from said waste liquid and for cleaning said scrubbing liquid from said pollutants dispersed in said waste liquid for reuse; and a secondary circulating reservoir fluidly connected to said primary circulating reservoir for receiving said cleaned scrubbing liquid therefrom and supplying said scrubbing liquid to said at least one liquid spray nozzle.

2. The system for purifying exhaust gas as defined in claim 1, further comprising at least one discharge aperture provided for introducing said coolant into said cooling container.

3. The system for purifying exhaust gas as defined in claim 1, wherein said coolant is said scrubbing liquid.

4. The system for purifying exhaust gas as defined in claim 1, wherein said scrubbing liquid is water.

5. The system for purifying exhaust gas as defined in claim 3, wherein said scrubbing liquid is water.

6. The system for purifying exhaust gas as defined in claim 2, wherein said coolant is said scrubbing liquid and said at least one discharge aperture introduces said scrubbing liquid into said cooling container from said secondary circulating reservoir.

7. The system for purifying exhaust gas as defined in claim 1, wherein said scrubbing liquid is supplied to said at least one liquid spray nozzle from said secondary circulating reservoir under pressure.

8. The system for purifying exhaust gas as defined in claim 7, wherein said scrubbing liquid is supplied to said at least one liquid spray nozzle under pressure by a third liquid pump.

9. The system for purifying exhaust gas as defined in claim 6, wherein said scrubbing liquid is supplied to said at least one discharge aperture from said secondary circulating reservoir under pressure.

10. The system for purifying exhaust gas as defined in claim 6, wherein said scrubbing liquid is supplied to said at least one discharge aperture from said secondary circulating reservoir under pressure by a third liquid pump.

11. The system for purifying exhaust gas as defined in claim 1, further comprising at least one air nozzle provided for introducing said purified exhaust gas into said exhaust gas converter chamber from said primary circulating reservoir.

12. The system for purifying exhaust gas as defined in claim 11, further comprising an air cooling/heating apparatus provided for selectively cooling or heating said purified exhaust gas prior to entering said exhaust gas converter chamber.

13. The system for purifying exhaust gas as defined in claim 12, further comprising a temperature sensor adapted to control said cooling/heating apparatus.

14. The system for purifying exhaust gas as defined in claim 11, wherein said purified exhaust gas is introduced into said exhaust gas converter chamber under pressure.

15. The system for purifying exhaust gas as defined in claim 1, further comprising a hollow casing housing said cooling container.

16. The system for purifying exhaust gas as defined in claim 15, further comprising at least one discharge opening provided for introducing said purified exhaust gas into said hollow casing from said primary circulating reservoir.

17. The system for purifying exhaust gas as defined in claim 16, further comprising an air cooling/heating apparatus provided for selectively cooling or heating said purified exhaust gas prior to entering said hollow casing.

18. The system for purifying exhaust gas as defined in claim 17, further comprising a temperature sensor adapted to control said cooling/heating apparatus.

19. The system for purifying exhaust gas as defined in claim 18, wherein said temperature sensor is disposed in said hollow casing.

20. The system for purifying exhaust gas as defined in claim 16, wherein said purified exhaust gas is introduced into said hollow casing under pressure.

21. The system for purifying exhaust gas as defined in claim 1, wherein said primary circulating reservoir comprises a separation tank fluidly connected to said exhaust gas converter chamber for receiving said moisture-saturated exhaust gas and provided for separating said purified exhaust gas from said waste liquid and for cleaning said scrubbing liquid by separating said scrubbing liquid from said pollutants dispersed in said waste liquid by gravity, said pollutants including a lightweight pollutants floating on a surface of said waste liquid in said separation tank and a heavyweight pollutants adapted to settle by gravity in a lower section of said separation tank.

22. The system for purifying exhaust gas as defined in claim 21, further comprising a lightweight pollutants storage tank fluidly connected to said separation tank and provided for receiving said lightweight pollutants from said separation tank transferred from said surface of said waste liquid in said separation tank.

23. The system for purifying exhaust gas as defined in claim 22, wherein said separation tank further comprises a device for measuring a surface level of a liquid, said device provided to activate a first suction pump that siphons out said floating lightweight pollutants into said lightweight pollutants storage tank when a level of said surface of said waste liquid in said separation tank rises up to a certain predetermined level.

24. The system for purifying exhaust gas as defined in claim 22, further comprising a lightweight pollutants disposal container fluidly connected to said lightweight pollutants storage tank through a second drain valve provided for selectively draining said lightweight pollutants into said lightweight pollutants disposal container from said lightweight pollutants storage tank.

25. The system for purifying exhaust gas as defined in claim 24, wherein said lightweight pollutants storage tank further comprises a device for measuring a surface level of a liquid, said device provided to open said second drain valve that drains said floating lightweight pollutants into said lightweight pollutants disposal container from said lightweight pollutants storage tank when a level of said lightweight pollutants in said lightweight pollutants storage tank rises up to a certain predetermined level.

26. The system for purifying exhaust gas as defined in claim 24, wherein said lightweight pollutants disposal container is detachably connected to said lightweight pollutants storage tank.

27. The system for purifying exhaust gas as defined in claim 21, further comprising a waste disposal container fluidly connected to said separation tank through a first drain valve provided for selectively draining said heavyweight pollutants into said waste disposal container from said separation tank.

28. The system for purifying exhaust gas as defined in claim 21, wherein said primary circulating reservoir further comprises a purified liquid tank fluidly connected to said separation tank through a first opening therebetween.

29. The system for purifying exhaust gas as defined in claim 28, wherein said first opening is provided with a liquid filter.

30. The system for purifying exhaust gas as defined in claim 21, wherein said primary circulating reservoir further comprises a circulation tank fluidly connected to said purified liquid tank through a second opening therebetween.

31. The system for purifying exhaust gas as defined in claim 30, wherein said second opening is provided with a liquid filter.

32. The system for purifying exhaust gas as defined in claim 30, wherein said circulation tank is provided with at least one liquid filter disposed therewithin adjacent to said second opening.

33. The system for purifying exhaust gas as defined in claim 30, wherein said circulation tank is provided with a third drain valve provided at a bottom portion thereof.

34. The system for purifying exhaust gas as defined in claim 6, wherein said the cooling chamber is further fluidly connected to said circulation tank for providing a circulation of said scrubbing liquid in said cooling container.

35. The system for purifying exhaust gas as defined in claim 30, wherein said secondary circulating reservoir comprises a scrubbing liquid reserve tank containing a certain amount of a fresh scrubbing liquid, said scrubbing liquid reserve tank is fluidly connected to said circulation tank through an access valve provided for selectively replenishing said circulation tank with said fresh scrubbing liquid from said scrubbing liquid reserve tank.

36. The system for purifying exhaust gas as defined in claim 35, wherein said circulation tank further comprises a device for measuring a surface level of a liquid, said device provided to open said access valve to replenish said circulation tank with said fresh scrubbing liquid from said scrubbing liquid reserve tank when a level of said scrubbing liquid in said circulation tank drops to a certain predetermined level.

37. The system for purifying exhaust gas as defined in claim 35, wherein said secondary circulating reservoir further comprises a clean scrubbing liquid container provided for receiving said cleaned scrubbing liquid from said circulation tank and supplying said at least one liquid spray nozzle with said scrubbing liquid.

38. The system for purifying exhaust gas as defined in claim 37, wherein said clean scrubbing liquid container comprises a primary clean scrubbing liquid tank fluidly connected to said circulation tank for receiving said cleaned scrubbing liquid therefrom.

39. The system for purifying exhaust gas as defined in claim 38, further comprising a liquid cooling apparatus provided for selectively cooling said cleaned scrubbing liquid prior to entering said primary clean scrubbing liquid tank.

40. The system for purifying exhaust gas as defined in claim 38, wherein said clean scrubbing liquid container comprises a secondary clean scrubbing liquid tank fluidly connected to said primary clean scrubbing liquid tank for receiving said cleaned scrubbing liquid therefrom.

41. The system for purifying exhaust gas as defined in claim 38, wherein said scrubbing liquid flows into said secondary clean scrubbing liquid tank from said primary clean scrubbing liquid tank by gravity.

42. The system for purifying exhaust gas as defined in claim 38, wherein said primary clean scrubbing liquid tank further comprises a liquid filter for further filtering said scrubbing liquid prior to entering said secondary clean scrubbing liquid tank.

43. The system for purifying exhaust gas as defined in claim 40, wherein said secondary clean scrubbing liquid tank supplies said at least one liquid spray nozzle with said scrubbing liquid.

44. The system for purifying exhaust gas as defined in claim 16, wherein said hollow casing has a vent opening provided to discharge said purified exhaust gas from said hollow casing into the ambient atmosphere.

45. The system for purifying exhaust gas as defined in claim 1, wherein said system is activated when an ignition of said combustion engine is switched on.

46. A method for purifying exhaust gas of a combustion engine, said method comprising the steps of:
   (a) passing said exhaust gas into an exhaust gas converter chamber;
   (b) cooling said exhaust gas converter chamber by providing a cooling jacket filled with a coolant and enveloping said exhaust gas converter chamber;
   (c) spraying a scrubbing liquid under pressure into a stream of said exhaust gas in said exhaust gas converter chamber for forming a moisture-saturated exhaust gas in order to remove pollutants dispersed in said exhaust gas and purifying said exhaust gas, said moisture-saturated exhaust gas including a waste liquid and a purified exhaust gas in the form of a substantially cleaned air;
   (d) passing said moisture-saturated moisture-saturated exhaust gas from a downstream end of said exhaust gas converter chamber into a primary circulating reservoir; and
   (e) separating said purified exhaust gas from said waste liquid and cleaning said scrubbing liquid from pollutants dispersed in said waste liquid for reuse, said pollutants including a lightweight pollutants float on a surface of said waste liquid in said primary circulating reservoir and a heavyweight pollutants settle by gravity in a lower section of said primary circulating reservoir.

47. The method for purifying exhaust gas as defined in claim 46, further including the step of providing a secondary circulating reservoir fluidly connected to said primary circulating reservoir for receiving said cleaned scrubbing liquid therefrom and supplying said scrubbing liquid for the step of spraying said scrubbing liquid into said stream of said exhaust gas in said exhaust gas converter chamber.

48. The method for purifying exhaust gas as defined in claim 46, further including the step of removing said lightweight pollutants from said surface of said waste liquid in said primary circulating reservoir.

49. The method for purifying exhaust gas as defined in claim 46, further including the step of removing said heavyweight pollutants from said primary circulating reservoir.

50. The method for purifying exhaust gas as defined in claim 47, further including the step of discharging said cleaned scrubbing liquid from said primary circulating reservoir to said secondary circulating reservoir.

51. The method for purifying exhaust gas as defined in claim 50, further including the step of filtering of said cleaned scrubbing liquid discharging from said primary circulating reservoir to said secondary circulating reservoir by a liquid filter.

52. The method for purifying exhaust gas as defined in claim 46, wherein said scrubbing liquid is water.

53. The method for purifying exhaust gas as defined in claim 46, further including the step of supplying said coolant into said cooling jacket.

54. The method for purifying exhaust gas as defined in claim 46, wherein said coolant is said scrubbing liquid.

55. The method for purifying exhaust gas as defined in claim 54, wherein said coolant is water.

56. The method for purifying exhaust gas as defined in claim 54, further including the step of circulating said scrubbing liquid within said cooling jacket.

57. The method for purifying exhaust gas as defined in claim 56, wherein said scrubbing liquid is supplied into said cooling jacket from a secondary circulating reservoir and said primary circulating reservoir, said secondary circulating reservoir is fluidly connected to said primary circulating reservoir for receiving said cleaned scrubbing liquid therefrom and supplying said scrubbing liquid for the step of spraying said scrubbing liquid into said stream of said exhaust gas in said exhaust gas converter chamber.

58. The method for purifying exhaust gas as defined in claim 46, wherein said exhaust gas converter chamber is disposed within a hollow casing.

59. The method for purifying exhaust gas as defined in claim 58, further comprising the step of introducing said purified exhaust gas into said hollow casing from said primary circulating reservoir.

60. The method for purifying exhaust gas as defined in claim 59, further comprising the step of selectively cooling or heating said purified exhaust gas prior to introducing said purified exhaust gas into said hollow casing.

61. The method for purifying exhaust gas as defined in claim 59, wherein said purified exhaust gas is introduced into said hollow casing under pressure.

62. The method for purifying exhaust gas as defined in claim 46, further comprising the step of introducing said purified exhaust gas into said exhaust gas converter chamber from said primary circulating reservoir.

63. The method for purifying exhaust gas as defined in claim 62, further comprising the step of selectively cooling or heating said purified exhaust gas prior to introducing said purified exhaust gas into said exhaust gas converter chamber.

64. The method for purifying exhaust gas as defined in claim 62, wherein said purified exhaust gas is introduced into said exhaust gas converter chamber under pressure.

65. The method for purifying exhaust gas as defined in claim 46, further comprising the step of discharging said purified exhaust gas into the ambient atmosphere.

66. The method for purifying exhaust gas as defined in claim 59, further comprising the step of discharging said purified exhaust gas into the ambient atmosphere from said hollow casing.

67. A combustion engine and exhaust discharge pipe in combination with a system for purifying exhaust gas from said combustion engine, said system for purifying exhaust gas comprising:
   a hollow casing;
   an exhaust gas converter chamber disposed with said casing, said exhaust gas converter in fluid communication with said exhaust discharge pipe of said engine for permitting a flow of the exhaust gas through said exhaust gas converter chamber;
   at least one liquid spray nozzle for spraying a scrubbing liquid into said exhaust gas converter chamber for forming a moisture-saturated exhaust gas in order to remove pollutants dispersed in the exhaust gas and purifying the exhaust gas, wherein the moisture-saturated exhaust gas includes a waste liquid and a purified exhaust gas in the form of substantially cleaned air;
   a cooling container disposed within said casing and defining a cooling jacket enveloping said exhaust gas converter chamber, said cooling jacket filled with a coolant to cool said exhaust converter chamber;

a primary circulating reservoir fluidly connected to said exhaust gas converter chamber for receiving the moisture-saturated exhaust gas for separating the purified exhaust gas from the waste liquid and for cleaning the scrubbing liquid from the pollutants dispersed in the waste liquid for reuse; and a secondary circulating reservoir fluidly connected to said primary circulating reservoir for receiving the cleaned scrubbing liquid therefrom and supplying the scrubbing liquid to said at least one liquid spray nozzle.

68. A vehicle with combustion engine and exhaust discharge pipe in combination with a system for purifying exhaust gas from said combustion engine, said system for purifying exhaust gas comprising:

a hollow casing;

an exhaust gas converter chamber disposed within said casing, said exhaust gas converter in fluid communication with said exhaust discharge pipe of said engine for permitting a flow of the exhaust gas through said exhaust gas converter chamber;

at least one liquid spray nozzle for spraying a scrubbing liquid into said exhaust gas converter chamber for forming a moisture-saturated exhaust gas in order to remove pollutants dispersed in the exhaust gas and purifying the exhaust gas, wherein the moisture-saturated exhaust gas includes a waste liquid and a purified exhaust gas in the form of substantially cleaned air;

a cooling container disposed within said casing and defining a cooling jacket enveloping said exhaust gas converter chamber, said cooling jacket filled with a coolant to cool said exhaust converter chamber;

a primary circulating reservoir fluidly connected to said exhaust gas converter chamber for receiving the moisture-saturated exhaust gas for separating the purified exhaust gas from the waste liquid and for cleaning the scrubbing liquid from the pollutants dispersed in the waste liquid for reuse; and a secondary circulating reservoir fluidly connected to said primary circulating reservoir for receiving the cleaned scrubbing liquid therefrom and supplying the scrubbing liquid to said at least one liquid spray nozzle.

69. A method for purifying exhaust gas in a system for purifying exhaust gas comprising a hollow casing; an exhaust gas converter chamber disposed within the casing, the exhaust gas converter adapted to be in fluid communication with an exhaust discharge pipe; at least one liquid spray nozzle for spraying a scrubbing liquid into the exhaust gas converter chamber; a cooling container disposed within the casing and defining a cooling jacket enveloping the exhaust gas converter chamber, the cooling jacket being filled with a coolant to cool the exhaust converter chamber; a primary circulating reservoir fluidly connected to the exhaust gas converter chamber; and a secondary circulating reservoir fluidly connected to the primary circulating reservoir; the method comprising:

passing the exhaust gas into the exhaust gas converter chamber disposed within the hollow casing;

cooling the exhaust gas convener chamber by providing a cooling jacket filled with a coolant and enveloping the exhaust gas converter chamber;

spraying a scrubbing liquid under pressure into a stream of the exhaust gas in the exhaust gas converter chamber for forming a moisture-saturated exhaust gas in order to remove pollutants dispersed in said exhaust gas and purifying the exhaust gas, the moisture-saturated exhaust gas including a waste liquid and a purified exhaust gas in the form of substantially cleaned air;

passing the moisture-saturated exhaust gas from a downstream end of the exhaust gas converter chamber into a primary circulating reservoir; and separating the purified exhaust gas from the waste liquid and cleaning the scrubbing liquid from the pollutants dispersed in the waste liquid for reuse, the pollutants including lightweight pollutants floating on a surface of the waste liquid in the primary circulating reservoir and heavyweight pollutants that settle by gravity in a lower section of the primary circulating reservoir.

* * * * *